United States Patent

[11] 3,581,562

| [72] | Inventor | Christopher Shorrock<br>Preston, England |
|---|---|---|
| [21] | Appl. No. | 819,639 |
| [22] | Filed | Apr. 28, 1969 |
| [45] | Patented | June 1, 1971 |
| [73] | Assignee | Allspeeds Holdings Limited<br>Clayton-le-Moors, Accrington, Lancashire, England |

[54] TORQUE-SENSING DEVICES
15 Claims, 5 Drawing Figs.

| [52] | U.S. Cl. | 73/136 |
|---|---|---|
| [51] | Int. Cl. | G01l 3/14 |
| [50] | Field of Search | 73/1, 136 |

[56] References Cited

UNITED STATES PATENTS

| 1,205,935 | 11/1916 | Rochstroh | 73/136 |
|---|---|---|---|
| 2,002,764 | 5/1935 | Bucklein | 73/136X |
| 2,582,784 | 1/1952 | Lumb et al. | 73/136 |
| 2,718,782 | 9/1955 | Steinbruegge et al. | 73/136 |
| 3,104,544 | 9/1963 | Guiot | 73/136 |
| 3,108,471 | 10/1963 | Buchele et al. | 73/136 |

FOREIGN PATENTS

| 1,428,830 | 1/1966 | France | 73/136 |
|---|---|---|---|
| 174,726 | 1/1922 | Great Britain | 73/136 |
| 304,349 | 1/1929 | Great Britain | 73/136 |
| 427,243 | 11/1947 | Italy | 73/136 |

Primary Examiner—Charles A. Ruehl
Attorney—Young & Thompson

ABSTRACT: The driving and driven shafts of a torque sensing device are connected by a flexible coupling which includes input and output shafts arranged to rotate with driven shafts respectively. The input and output shafts work in a coupling sleeve, the internal wall of the sleeve and the ends of the input and output shafts defining a chamber filled with fluid and having an outlet to an indicating device. The drive between the input and output shafts and the sleeve consists for each shaft of a pair of diametrically opposed fins on the sleeve which work in opposed helical slots in the shaft. Under load the position of the fins in the slots varies thus moving the shafts together or apart thereby varying the fluid pressure in proportion to the torque and operating the indicating device.

PATENTED JUN 1 1971

Inventor
CHRISTOPHER SHORROCK
By Young & Thompson
Attorneys

Inventor
CHRISTOPHER SHORROCK
By Young & Thompson
Attorneys

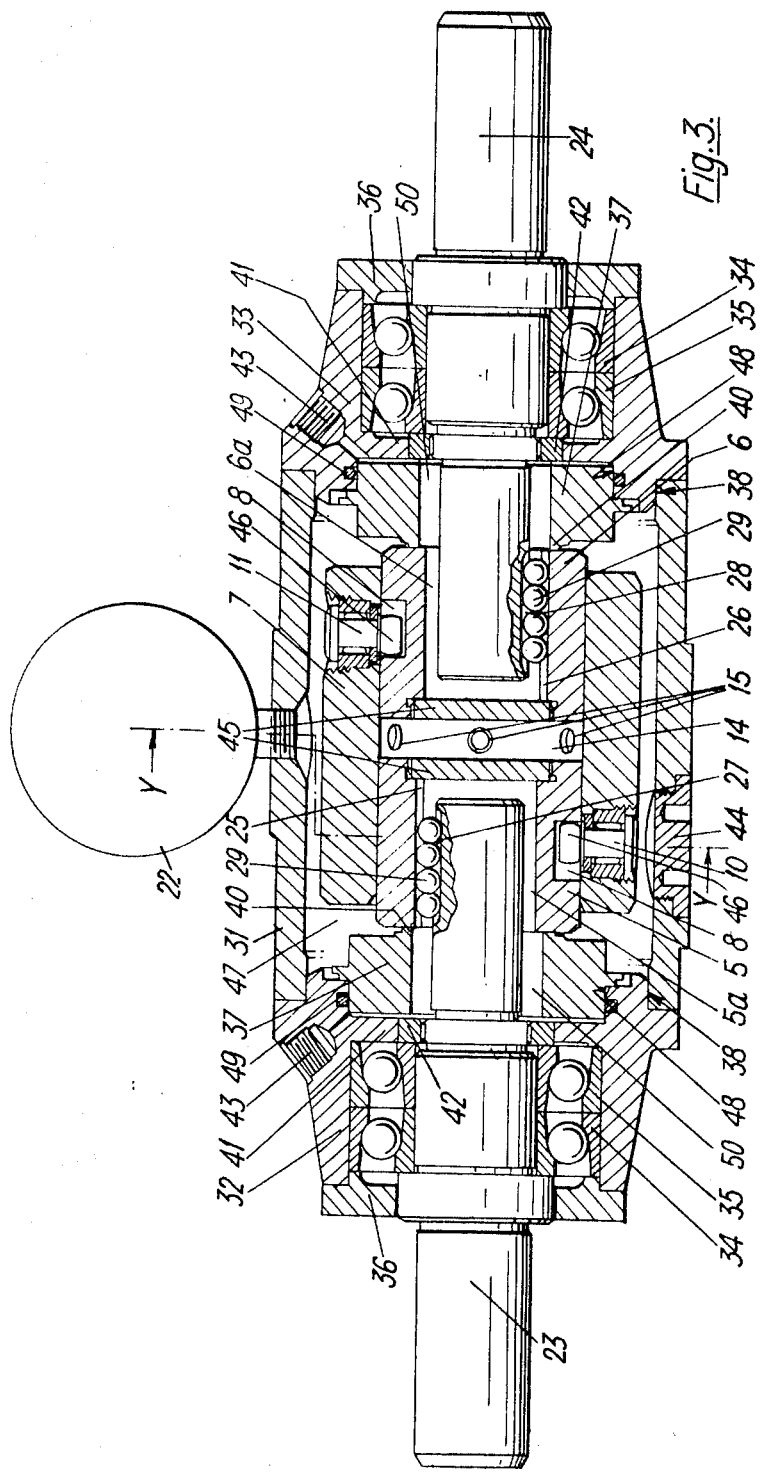

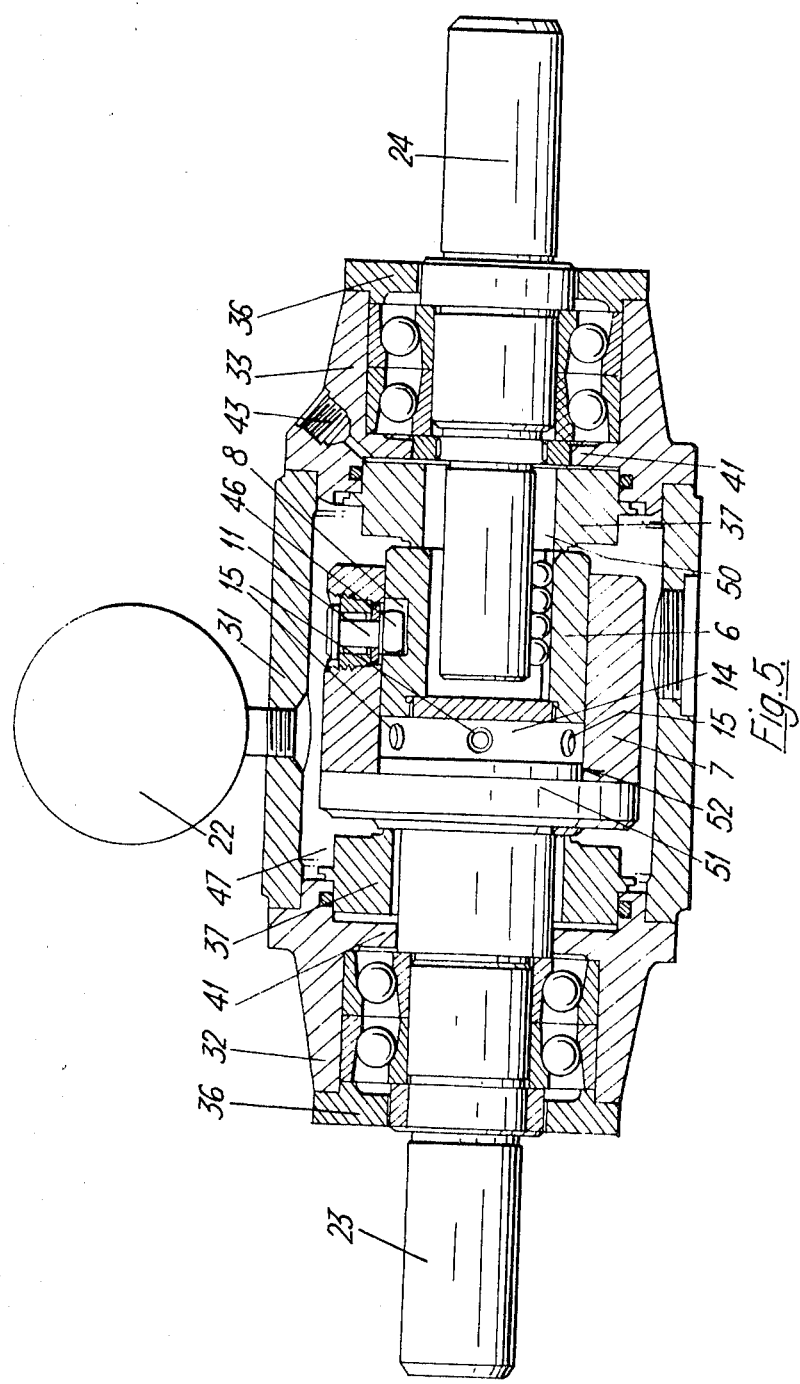

TORQUE-SENSING DEVICES

This invention relates to apparatus for sensing torque.

Torque-sensing devices are well known and usually consist of a fluid-filled coupling, having a degree of flexibility, arranged between a driving and a driven shaft. Different types of coupling have been proposed, some of which are of considerable complexity and consequent high cost.

Some known devices include a member which is displaceable under load conditions to vary the volume of a liquid-filled enclosed chamber to an extent proportional to the applied torque, the change in volume being indicated by suitable indicating means. Generally the enclosed chamber is stationary involving the use of thrust bearings between rotating parts of the apparatus. In other devices, the displaceable member is the one of the input or output shafts of the apparatus so that in operation the overall length of the apparatus varies.

It is one of the objects of the present invention to provide a torque-sensing apparatus in which the use of thrust bearings is avoided.

It is a further object of the invention to provide novel apparatus for ensuring that in operation the overall length of the apparatus does not change.

According to one feature of the invention, the enclosed chamber rotates with the input and output shafts and is in communication with a liquid-filled stationary chamber to which the indicating device is connected.

According to another feature of the invention, a coupling member drivingly connects an input shaft to an output shaft, the connection including a drive member for at least one of the shafts and coupling means are provided between the drive member and the associated shaft allowing the transmission of rotary movement between the drive member and the associated shaft and allowing axial displacement of the drive member with respect to the associated shaft.

Embodiments of the present invention will now be described by way of example with reference to the accompanying drawings in which:

FIG. 3 shows a cross-sectional elevation of torque-measuring apparatus suitable for use in the arrangement of FIG. 1 according to a second embodiment of the present invention;

FIG. 4 shows a sectional end view of the apparatus of FIG. 3 through the line Y-Y and looking in the direction of the arrows; and FIG. 5 shows a modified form of the torque-measuring apparatus of FIG. 3.

Figure 1:
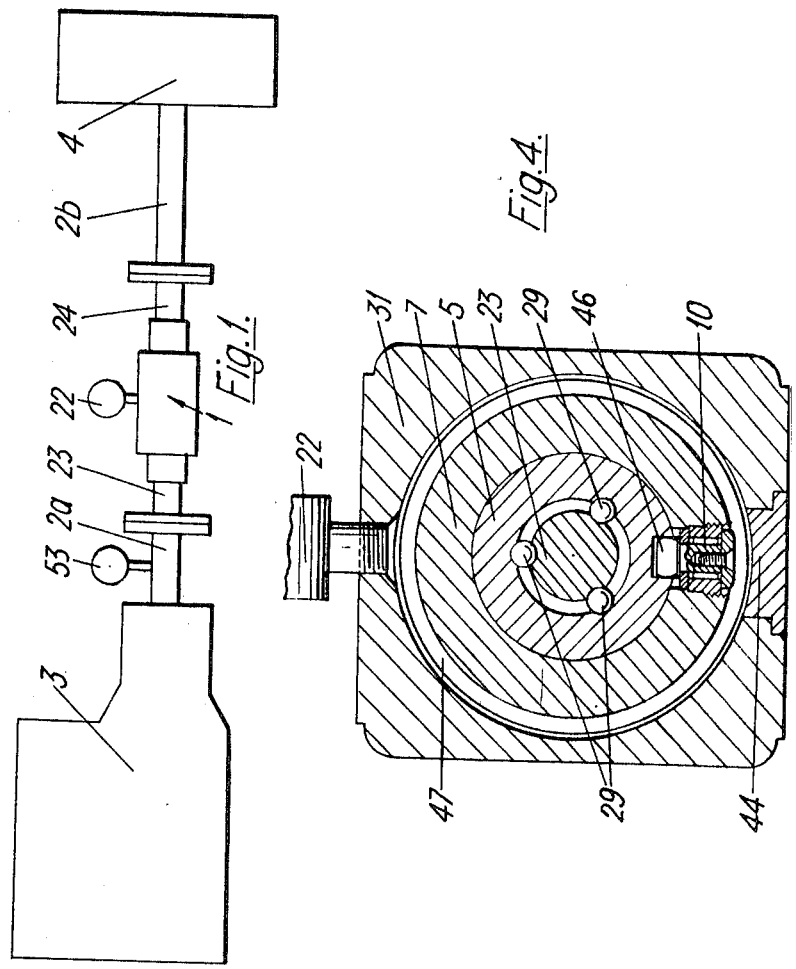
FIG. 1 shows a schematic view of a power source driving a load through a transmission line including torque-measuring apparatus.
Figure 2:
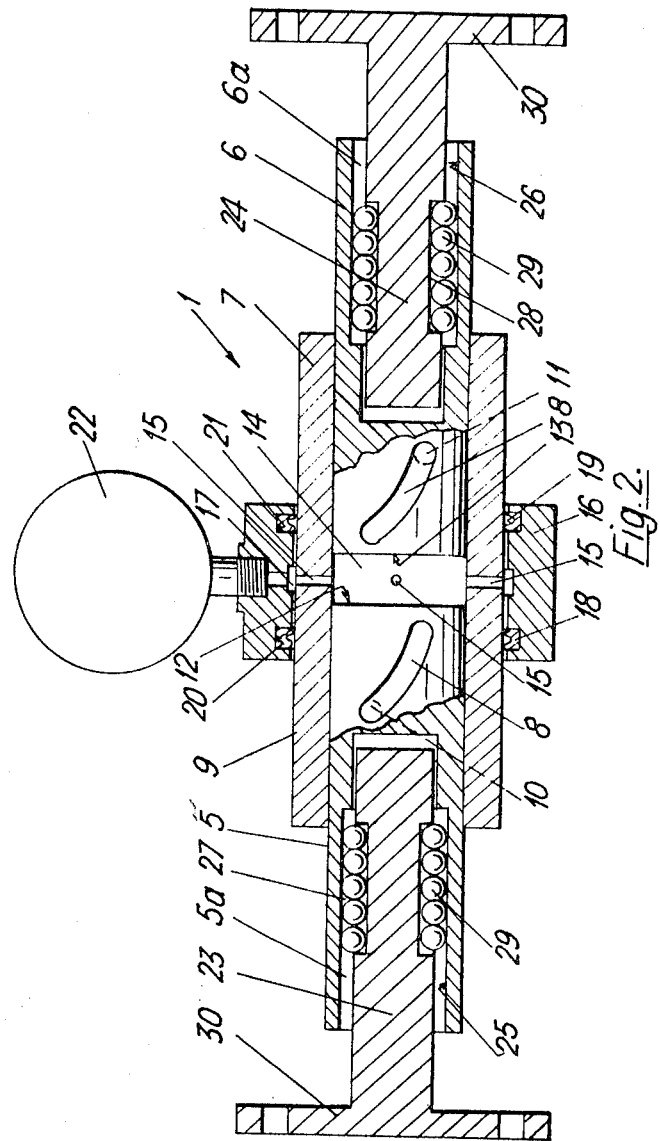
FIG. 2 shows a cross-sectional elevation of torque-measuring apparatus suitable for use in the arrangement of FIG. 1 according to one embodiment of the present invention.

Referring to FIGS. 1 and 2, torque measuring apparatus 1 is interposed in the transmission line 2a, 2b from an internal combustion engine 3 to an external load 4 such as, for example, the driven wheels of a car or the propeller of a ship. The torque-measuring apparatus 1 includes an input shaft 5 and an output shaft 6, each shaft 5, 6 being in the form of a skirted piston, and a coupling sleeve 7 into the respective ends of which the shafts 5, 6 project, the shafts 5,6 being a sliding fit in the sleeve 7. The sleeve 7 drivingly interconnects the shafts 5, 6 in a manner to be described.

On the outer periphery of each shaft 5, 6 there are provided a pair of opposed helical slots 8 (only one shown); and there are appropriately located on the wall 9 of the sleeve 7 two pairs of opposed inwardly projecting pins 10, 11, each pair 10, 11 engaging a respective pair of slots 8 of the shafts 5, 6. The inner end faces 12, 13 of the shafts 5, 6 and the inner peripheral wall of the sleeve 7 define a chamber 14, the pin-and-slot arrangement 8, 10 and 8, 11 being such as to prevent the abutment of the opposed end faces 12, 13 of the shafts 5, 6 A plurality of radially extending through-bores 15 lead off from the chamber 14 to the outer peripheral surface of the sleeve 7, the bores 15 being coplanar; and a stationary collar 16 fitted over the sleeve 7 has an annular channel 17 positioned centrally on the inner periphery thereof, and the collar 16 is positioned so that the through-bores 15 communicate with the channel 17. A pair of sealing rings 18, 19 located in grooves 20, 21 in the collar 16 seal the collar to sleeve interface. The chamber 14 is filled with a liquid, and the collar 16 carries a gauge 22 in communication with the channel 17 and consequently with the chamber 14. Each pin-and-slot arrangement 8, 10 and 8, 11 is such that when correctly directioned opposed equal torques are applied to the shafts 5, 6 and the shafts tend to move towards each other with resulting relative angular displacement between the sleeve 7 and the shafts 5, 6, the volume of the chamber 14 will tend to decrease, the decrease being directly proportional to the applied torque; and the gauge 22 is provided with a scale appropriately calibrated in torque values.

A pair of similar shafts 23, 24 interconnect the input and output shafts 5, 6 to the drive 2a from the engine 3 and to the input 2b to the load 4 respectively. The skirt portion of each shaft 5, 6 serves as a socket 5a, 6a for receiving an end of its respective shaft 23, 24. On the peripheral wall of each socket 5a, 6a there are located a pair of opposed slots 25, 26, and the associated shaft 23 or 24 has a pair of opposed keyways 27, 28 each housing a ball-race 29. Each shaft 23, 24 can consequently cause rotation of its associated shaft 5, 6 via the ball-races 29; and by means of the ball-races 29, relative axial movement can occur between each pair of shafts 6, 23 or 6, 24. Each shaft 23, 24 is provided with a flanged end 30 including provisions for coupling up of the shaft 23, 24 to the transmission line 2a, 2b.

In operation of the torque-measuring apparatus 1, the internal combustion engine 3 will drive the input shaft 5 through the flanged shaft 23; and the drive will be transmitted through the sleeve 7 to the output shaft 6 whence to the output shaft 24 and to the load 4. Equal and opposite torques will consequently be applied to the shafts 5, 6.

Reaction will occur between each pair of pins 10, 11 and their corresponding slots 8; and the reaction force, due to the helical nature of the slot 8, will have an axial component towards the chamber 12 and will act against the shaft 5, 6, whereby the shafts 5, 6 will move towards each other, relative angular displacement occuring between the sleeve 7 and shafts 5, 6 during the movement and a tangential component providing the driving torque. Axial equilibrium will be attained when the pressure of the fluid in the chamber 12, acting against the inner faces 12, 13 of the shafts 5, 6, equals the aforesaid axial component of the reaction force on each shaft. The axial component will be proportional to the tangential component of force. The liquid pressure within the chamber 14 will actuate the pressure gauge 22 which will indicate the value of the torque being transmitted. With increase or decrease in the load 4, and torque transmitted, the shafts 5, 6 will move to respectively decrease or increase the volume of chamber 14.

In the alternative embodiment of the present invention shown in FIG. 3, parts corresponding to parts in the FIG. 2 embodiment have been given the same reference numerals as those parts in FIG. 2. The embodiment shown in FIG. 3 is intended for commercial application whilst the embodiment of FIG. 2 is intended as a prototype for demonstration and experimental purposes.

Referring to FIGS. 3 and 4, a cylindrical casing 31 which replaces the collar 16 of FIG. 2 arrangement houses the shafts 5, 6 and sleeve 7, and is shrunk onto the spigots 38 of axial extensions 32, 33. Each extension 32, 33 houses a side-by-side pair of single row ball bearings 34, 35 which support a respective one of the shafts 23, 24, the ball bearing rows 34, 35, of each pair being arranged to resist the axial thrusts of its respective shaft 23, or 24. The casing 31 provides a bath 47 for the liquid such as for example oil, the shafts 5, 6 and the sleeve 7 being immersed in the oil. The radial bores 15 communicate the chamber 14 with the bath 47.

Again, the shafts 23, 24 are drivingly connected to the shafts 5, 6 respectively by means of ball bearings linking the slots 25, 26 with the axial slots 27, 28 in the shafts 23, 24 whereby relative axial displacement can occur between the shaft pairs 5, 23 or 6, 24. The shafts 5, 6 which are in the form of cylinders are closed at their inner ends by plug discs 45 screwed into the shafts 5, 6. The pins 10, 11 are secured to the peripheral wall 9 of the sleeve 7 and have roller heads 46 located in the helical slots 8 of the shafts 5, 6 respectively. The pin-and-slot arrangements 8, 10 and 8, 11 can be arranged to cater for either direction of rotation of the shafts 5, 6.

To prevent leakage of oil from the bath 47, seals 37 of the mechanical type are located between the outer ends of the shafts 5, 6 and the extensions 32, 33. Each mechanical seal 37 includes a collar of graphite, the outer periphery of which slidingly engages an axially extending annular wall 48 of its respective extension 32 or 33, a sealing ring 49 being provided between the outer periphery of the seal 37 and the wall 48. A light spring (not shown) within each seal 37 engages a radial wall 41 of each extension 32, 33 to force an annular lip 40 of the seal 37 into sealing abutment with the outer end wall of the shafts 5, 6. An additional annular seal 42 surrounds each shaft 5, 6 adjacent the mechanical seal 37; and a cap 36 is provided at the outer end of each extension 32, 33.

An air vent 43 is provided in each extension to ensure that the air zone 50 which is separated from the oil bath 47 by the mechanical seals 37 is at atmospheric pressure. The effect of the spring force on the system is almost negligible; but can be catered for by appropriate calibration of the gauge 22. A plug 44 in the casing 31 permits draining or filling of the oil bath 47.

The torque measuring apparatus of the second embodiment of the invention operates in a manner similar to that of the first embodiment. In this case however, the displacement of the liquid in the chamber 14 resulting from a decrease of the chamber's volume is transmitted to the liquid of the bath 47. Thereupon, the pressure gauge 22 is actuated by the displacement of liquid into bath 47 to indicate the value of the transmitted torque. The lip 40 of each seal 37 is maintained in contact with its respective shaft 5 or 6 for all movements of the shaft 5, 6.

In the modification to the torque measuring apparatus of FIG. 3, shown in FIG. 5, only the single shaft 6 is moveable in the sleeve 7, the sleeve 7 being directly coupled to the shaft 23 which is normally associated with the shaft 5. Thus, referring to FIG. 5, the shaft 23 carries a head 51 on to a spigot 52 of which the sleeve 7 is shrunk. Again, a pair of mechanical seals 37 are provided, one between the shaft 6 and the extension 33 and the other between the head 51 and the extension 32.

The modified form of the apparatus operates in a manner similar to that of the apparatus of FIG. 3 but, in this case the shaft 6 would move towards the outer face of the head 51 on the application of a torque to the system. Whereas the arrangement of FIG. 5 allows considerable simplification in the apparatus, it has the disadvantage however, that a substantial unbalanced axial thrust will occur, acting on one of the shafts 23 or 24. By providing the two opposed axially moveable shafts 5, 6 as described in the FIGS. 2 and 3, embodiments of the invention, so that the arrangement is symmetrical on either side of the chamber 14, this disadvantage is avoided.

Further modifications are, of course, possible in the apparatus. For example, in the FIG. 3 and FIG. 5 embodiments of the invention, seals other than the mechanical type could be used in place of the mechanical seals 37.

Whereas, in the described embodiments of the present invention the torque measuring apparatus was used in the testing of mobile equipment, the apparatus could alternatively be operate a warning device or actuate a cutout device to stop the drive or decrease the load when the maximum safe load conditions are exceeded.

I claim:

1. Torque-sensing apparatus comprising rotary input drive means, rotary output drive means, a drive member included in at least one of said drive means, a coupling member for drivingly connecting said input and output drive means, a liquid-filled rotary enclosed chamber formed by said coupling member, an end wall of the drive member included in said one drive means and the second drive means, the coupling member being connected to said drive member so that under load conditions said drive member is displaceable relative to said coupling member to vary the volume of said chamber to an extent proportional to the applied torque, a liquid-filled stationary enclosed chamber of constant volume, communicating means between said rotary chamber and said stationary chamber and indicating means connected to said stationary chamber and responsive to the change in volume of said rotary chamber to give an indication of the applied torque.

2. Torque sensing apparatus as claimed in claim 1 and including a casing housing the coupling member and at least a portion of both the input and output drive means, the casing providing a liquid-filled bath in which said coupling member and said portions of both the input and output drive means are immersed, the bath forming said stationary chamber and seal means located between said drive member and one end wall of said casing and between said other drive means and a second end wall of said casing.

3. Torque-sensing apparatus as claimed in claim 2 and including first and second sockets in the respective first and second end walls of said casing and said seal means comprises a first collar device surrounding said input drive means and a penetrating said first socket, a second collar device surrounding said output drive means and penetrating said second socket and a seal between each of said collar devices and the bore of the respective socket.

4. Torque-sensing apparatus as claimed in claim 1 and including means fixedly connecting said coupling member to said second drive means and a spigot-and-socket connection between said coupling member and said drive member.

5. Torque-sensing apparatus as claimed in claim 4 wherein said spigot-and-socket connection comprises at least one helical slot in the outer surface of said drive member and a cooperating slot-engaging pin on the inner surface of said coupling member.

6. Torque-sensing apparatus comprising rotary input drive means, rotary output drive means, a first drive member included in said input drive means, a second drive member included in said output drive means, a coupling member for drivingly connecting said input and said output drive means, a liquid-filled rotary enclosed chamber formed by said coupling member and an end wall of each of said first and second drive members, the coupling member being connected to said drive members so that under load conditions said drive members are displaceable relative to said coupling member to vary the volume of said chamber to an extent proportional to the applied torque, a liquid-filled stationary chamber of constant volume, communicating means between said rotary chamber and said stationary chamber and indicating means connected to said stationary chamber and responsive to the change in volume of said rotary chamber to give an indication of the applied torque.

7. Torque-sensing apparatus as claimed in claim 6 and including a stationary collar surrounding said coupling member, a liquid reservoir in said collar constituting said stationary and said portions of both the input and output drive means are immersed, the bath forming said stationary chamber and seal means located between each of said drive members and respective end walls of said casing.

9. Torque-sensing apparatus as claimed in claim 8 and including first and second sockets in the respective end walls of said casing and said seal means comprises a first collar device surrounding said input drive means and penetrating said first socket, a second collar device surrounding said output drive means and penetrating said second socket and a seal between each of said collar devices and the bore of the respective socket.

10. Torque-sensing apparatus as claimed in claim 6 and including a first spigot-and-socket connection between said first drive member and said coupling member and a second spigot-and-socket connection between said second drive member and said coupling member.

11. Torque-sensing apparatus as claimed in claim 10 wherein said spigot-and-socket connections each comprise at least one helical slot in the outer surface of the respective drive member and a cooperating slot engaging pin on the inner surface of said coupling member.

12. Torque-sensing apparatus comprising a first shaft, a second shaft, a drive member for said first shaft, first coupling means between said first shaft and said drive member allowing the transmission of rotary movement between said first shaft and said drive member and allowing axial displacement of said drive member with respect to said first shaft, second coupling means secured to said second shaft and surrounding said drive member, an enclosed chamber formed by said second coupling means and by the respective end walls of said second shaft and said drive member, said second coupling means being so connected to said drive member that under load conditions irrespective of the direction of rotation of said first and second shafts, said drive member is axially displaceable with respect to said first shaft and with respect to said second coupling means to vary the volume of said chamber to an extent proportional to the applied torque and indicating means responsive to the change in volume of said chamber to give an indication of the applied torque.

14. Torque-sensing apparatus comprising a driving shaft, a driven shaft, a first drive member for said driving shaft, a second drive member for said driven member, first coupling means between said driving shaft and said first drive member allowing the transmission of rotary movement from said driving shaft to said first drive member and allowing axial displacement of said first drive member with respect to said driving shaft, second coupling means between said driven shaft and said second drive member allowing the transmission of rotary movement from said second drive member to said driven shaft, third coupling means surrounding said first and second drive members, an enclosed chamber formed by said third coupling means and by the respective end walls of said first and second drive members, said third coupling means being so connected to said first and second drive members that under load conditions and irrespective of the direction of rotation of said first and second shafts said first and second drive means are axially displaceable with respect to said driving and driven shafts and with respect to said third coupling means to vary the volume of said chamber to an extent proportional to the applied torque and indicating means responsive to the change in volume of said chamber to give an indication of the applied torque.

13. Torque-sensing apparatus as claimed in claim 12 wherein said first coupling means includes a ball race located in opposed axial grooves in said drive member and said first shaft.

15. Torque-sensing apparatus as claimed in claim 14 wherein said first and second coupling means each include a ball race located in opposed axial grooves in said drive member and the respective shaft.